United States Patent
Sato et al.

(10) Patent No.: US 10,268,015 B2
(45) Date of Patent: Apr. 23, 2019

(54) OPTICAL FIBER CABLE HAVING A PLURALITY OF STRANDED OPTICAL FIBER RIBBONS

(71) Applicant: SUMITOMO ELECTRIC INDUSTRIES, LTD., Osaka-shi, Osaka (JP)

(72) Inventors: Fumiaki Sato, Yokohama (JP); Keisuke Okada, Yokohama (JP); Yoshiaki Nagao, Yokohama (JP); Nobuyuki Suzuki, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/771,784

(22) PCT Filed: Jan. 26, 2017

(86) PCT No.: PCT/JP2017/002813
§ 371 (c)(1),
(2) Date: Apr. 27, 2018

(87) PCT Pub. No.: WO2017/131117
PCT Pub. Date: Aug. 3, 2017

(65) Prior Publication Data
US 2018/0348464 A1 Dec. 6, 2018

(30) Foreign Application Priority Data
Jan. 28, 2016 (JP) ................................ 2016-014481

(51) Int. Cl.
*G02B 6/44* (2006.01)

(52) U.S. Cl.
CPC ............. *G02B 6/4495* (2013.01); *G02B 6/44* (2013.01); *G02B 6/4492* (2013.01)

(58) Field of Classification Search
CPC ........................... G02B 6/4492; G02B 6/4496
See application file for complete search history.

(56) References Cited

U.S. PATENT DOCUMENTS

| 5,621,841 A * | 4/1997 | Field .................... G02B 6/4411 385/113 |
| 6,269,210 B1 * | 7/2001 | Yagi ..................... G02B 6/4403 385/110 |

(Continued)

FOREIGN PATENT DOCUMENTS

| JP | 2001-33672 A | 2/2001 |
| JP | 2001-201675 A | 7/2001 |

(Continued)

*Primary Examiner* — Akm E Ullah
(74) *Attorney, Agent, or Firm* — Drinker Biddle & Reath LLP

(57) ABSTRACT

This optical fiber cable comprises an optical unit obtained by creating strands of a plurality of optical fiber tape cores, a tube in which the optical unit is housed, and a cable sheath that covers the outside of an aggregate of a plurality of tubes. The optical fiber tape cores have provided thereto, between some or all of optical fiber cores when a plurality of optical fiber cores are positioned in parallel, and intermittently in the longitudinal direction thereof, connecting parts that connect adjoining optical fiber cores, and non-connecting parts at which adjoining optical fiber cores are not connected. The tube has a Young's modulus lower than the Young's modulus of the cable sheath, and the aggregate is such that the plurality of tubes on the inside of the cable sheath deform elastically with respect to one another, with some thereof being in surface contact with the cable sheath.

5 Claims, 2 Drawing Sheets

(56) References Cited

U.S. PATENT DOCUMENTS

| | | | |
|---|---|---|---|
| 6,377,738 B1 * | 4/2002 | Anderson | G02B 6/4433 385/100 |
| 6,757,465 B1 * | 6/2004 | Yokokawa | G02B 6/4405 385/113 |
| 7,054,531 B2 * | 5/2006 | Hurley | G02B 6/441 385/102 |
| 7,162,161 B2 * | 1/2007 | Wyatt | A61F 9/008 398/139 |
| 7,838,810 B2 * | 11/2010 | Shimoi | H01J 43/28 250/207 |
| 9,304,032 B2 * | 4/2016 | Cornu | G01G 3/13 |
| 2005/0226573 A1 * | 10/2005 | Okuno | G02B 6/02004 385/114 |
| 2006/0198586 A1 * | 9/2006 | Rosenquist | G02B 6/4403 385/114 |
| 2007/0104429 A1 * | 5/2007 | Yokokawa | G02B 6/4434 385/112 |
| 2015/0049996 A1 * | 2/2015 | Gibbs | G02B 6/441 385/103 |
| 2015/0192748 A1 * | 7/2015 | Sato | G02B 6/4403 385/114 |

FOREIGN PATENT DOCUMENTS

| | | |
|---|---|---|
| JP | 2005-316493 A | 11/2005 |
| JP | A-2008-310040 | 12/2008 |
| JP | 2010-8923 A | 1/2010 |
| JP | 3185722 U | 8/2013 |
| JP | A-2013-174678 | 9/2013 |
| JP | 2014-202795 A | 10/2014 |
| JP | 2015-99315 A | 5/2015 |
| JP | 2015-517679 A | 6/2015 |
| JP | 2015-129887 A | 7/2015 |
| JP | A-2015-166806 | 9/2015 |
| JP | 2015-215400 | 12/2015 |
| WO | WO-2006/051898 A1 | 5/2006 |
| WO | WO-2013/165407 A1 | 11/2013 |

* cited by examiner

OPTICAL FIBER CABLE HAVING A PLURALITY OF STRANDED OPTICAL FIBER RIBBONS

TECHNICAL FIELD

The present invention relates to an optical fiber cable.

The subject application claims priority from Japanese Patent Application No. 2016-014481 filed on Jan. 28, 2016, the entire contents of which are incorporated herein by reference.

BACKGROUND ART

Patent Document 1 discloses a loose tube type optical fiber cable in which intermittently joined optical fiber ribbons are accommodated in a cylindrical pipe (tube) made of a hard material such as PBT, metal or the like and a plurality of the pipes is covered with a cylindrical outer pipe (cable sheath). Patent Document 2 discloses a slot-less type optical fiber cable including a cable core part having a wrapping layer provided on an outer periphery of an assembly, which is formed by stranding a plurality of units each of which is formed by winding a distinguishable thread on assembled optical fibers configuring an intermittent coupling type optical fiber ribbon, and a sheath provided on an outer periphery of the cable core part.

CITATION LIST

Patent Documents

Patent Document 1: JP-A-2015-517679
Patent Document 2: JP-A-2010-8923

SUMMARY OF THE INVENTION

An optical fiber cable of an aspect of the present disclosure is an optical fiber cable includes an optical unit having a plurality of stranded optical fiber ribbons, a tube having the optical unit accommodated therein, and a cable sheath configured to cover an outer side of an assembly including a plurality of the tubes, wherein each of the optical fiber ribbons is intermittently provided with coupling portions, at which adjacent optical fibers are coupled therebetween, and non-coupling portions, at which adjacent optical fibers are not coupled therebetween, in a longitudinal direction between a part or all of the optical fibers in a state where the plurality of optical fibers is arranged in parallel, wherein each tube has a Young's modulus lower than a Young's modulus of the cable sheath, and wherein the assembly is in a state where a part of the plurality of tubes is in surface contact with the cable sheath with the tubes being elastically deformed with respect to another tube inside the cable sheath.

DETAILED DESCRIPTION OF ILLUSTRATIVE EMBODIMENTS

Figure 1:
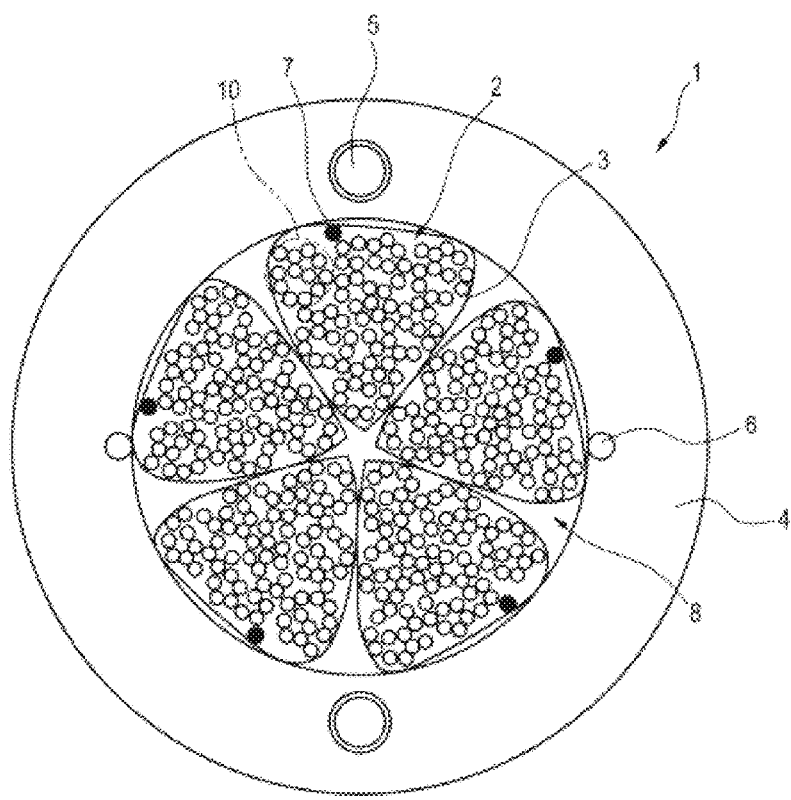
FIG. 1 is a sectional view depicting an example of an optical fiber cable in accordance with an aspect of the present disclosure.

[Problems to be Solved by the Present Disclosure]

A loose tube type optical fiber cable is configured so that when a cable sheath is torn upon intermediate branching, each of cylindrical tubes is exposed. Thereby, it is possible to take out optical fibers by tearing only the tube having desired optical fibers accommodated therein, and to easily accommodate the optical fibers in a closure and the like. In the meantime, since the plurality of cylindrical hard tubes is arranged inside the cylindrical cable sheath, a gap is large, and it is thus difficult to pack the optical fibers in a high density.

In the meantime, since the slot-less type optical fiber cable as disclosed in Patent Document 2 does not use the tube, it is possible to easily pack the optical fibers in a high density. However, when the cable sheath is torn upon intermediate branching, all the optical fibers are exposed. Since the exposed optical fibers are not accommodated in the tube, the respective optical fibers are likely to be scattered in all direction, so that the operability is deteriorated when accommodating the optical fibers in the closure and the like.

It is therefore an object of the present disclosure to provide an optical fiber cable capable of implementing high-density packing and having favorable operability upon intermediate branching.

[Effects of the Present Disclosure]

According to the present disclosure, it is possible to provide an optical fiber cable capable of implementing high-density packing and having favorable operability upon intermediate branching.

[Description of Illustrative Embodiment of the Present Invention]

First, an illustrative embodiment of the present invention is described.

An optical fiber cable in accordance with an illustrative embodiment of the present invention is:

(1) An optical fiber cable includes an optical unit having a plurality of stranded optical fiber ribbons, a tube having the optical unit accommodated therein, and a cable sheath configured to cover an outer side of an assembly including a plurality of the tubes, wherein each of the optical fiber ribbons is intermittently provided with coupling portions, at which adjacent optical fibers are coupled therebetween, and non-coupling portions, at which adjacent optical fibers are not coupled therebetween, in a longitudinal direction between a part or all of the optical fibers in a state where the plurality of optical fibers is arranged in parallel, wherein each tube has a Young's modulus lower than a Young's modulus of the cable sheath, and wherein the assembly is in a state where a part of the plurality of tubes is in surface contact with the cable sheath with the tubes being elastically deformed with respect to another tube inside the cable sheath.

In the optical fiber cable of the above (1), the tube has a Young's modulus lower than a Young's modulus of the cable sheath and can be thus easily deformed. Therefore, the assembly of the plurality of tubes is in the state where the plurality of tubes is in surface contact with the cable sheath with being elastically deformed with respect to one another inside the cable sheath. In this state, as compared to a configuration where each hard tube is hardly elastically deformed and keeps its cylindrical state, a gap inside the cable sheath is reduced, so that it is possible to implement the high-density packing of the optical fibers. Also, when the cable sheath is torn upon the intermediate branching, each tube is exposed. Therefore, when only a predetermined tube is torn to take out the optical fibers, only the optical fibers of the predetermined tube can be integrally exposed. As a result, it is possible to improve the operability when accommodating the optical fibers in a closure and the like.

(2) In the optical unit, a density of fibers of the optical fiber ribbons is equal to or higher than 1.7 fibers/mm$^2$. Since the tube can be easily deformed, it is possible to easily implement the optical fiber cable in which the density of fibers of the optical fiber ribbons is equal to or higher than 1.7 fibers/mm$^2$.

(3) The tube has a thickness which is equal to or thicker than 0.03 mm and which is equal to thinner than 0.2 mm. The tube is made to have the thin thickness which is equal to or thicker than 0.03 mm and which is equal to thinner than 0.2 mm, so that it is possible to more easily deform the tube.

(4) The tube has the Young's modulus which is equal to or higher than 10 MPa and which is equal to or lower than 400 MPa. The tube is made to have the Young's modulus which is equal to or higher than 10 MPa and which is equal to or lower than 400 MPa, so that it is possible to more easily deform the tube.

(5) The tube includes jelly therein.

(6) The tube includes water absorption yarn therein.

The tube includes jelly or water absorption yarn therein, so that it is possible to provide the tube with a waterproof function.

(7) The tube includes a tearing cord therein.

Since the tube includes therein the tearing cord, it is possible to easily disassemble only a predetermined tube simply by pulling the tearing cord.

[Details of Illustrative Embodiment of the Present Invention]

A specific example of the optical fiber cable in accordance with the illustrative embodiment of the present invention will be described with reference to the drawings.

In the meantime, the present invention is not limited to the example, is defined in the claims, and includes all changes within a meaning and a range equivalent to the claims.

Figure 2:
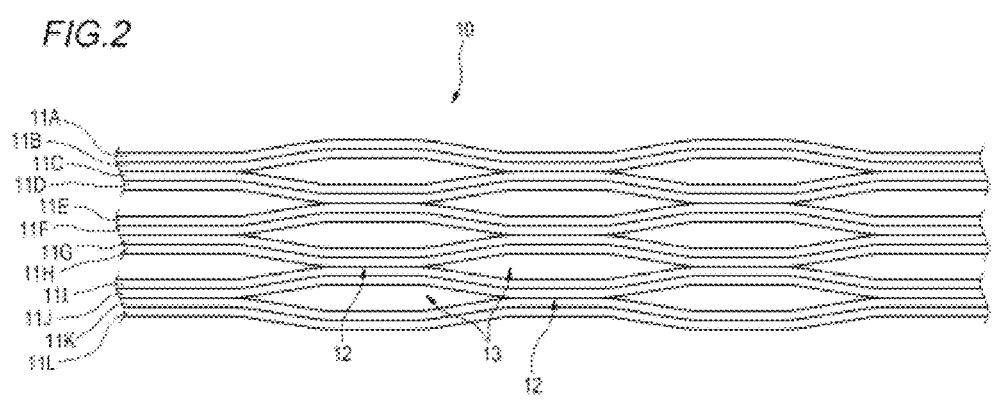
FIG. 2 is a plan view of an intermittent coupling type optical fiber ribbon of 12 fibers accommodated in a tube.
Figure 3:
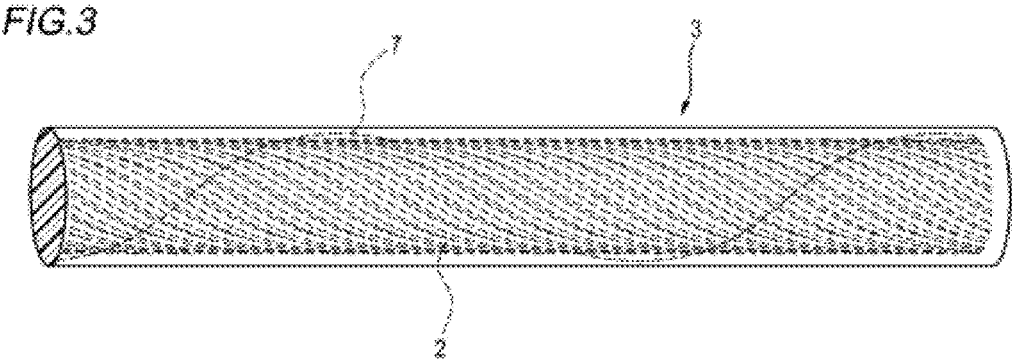
FIG. 3 is a pictorial view of the tube in which an optical unit having a plurality of stranded optical fiber ribbons is accommodated.

FIG. 1 is a sectional view depicting an example of an optical fiber cable in accordance with the illustrative embodiment. FIG. 2 is a plan view of an intermittent coupling type optical fiber ribbon of 12 fibers accommodated in a tube. FIG. 3 is a pictorial view of the tube in which an optical unit having a plurality of stranded optical fiber ribbons is accommodated.

As shown in FIG. 1, an optical fiber cable 1 of the illustrative embodiment includes optical units 2, tubes 3 each of which having the optical unit 2 accommodated therein, and a cable sheath 4 configured to cover an outer side of an assembly including a plurality of the tubes 3.

The optical unit 2 has a plurality of stranded optical fiber ribbons 10.

As shown in FIG. 2, the optical fiber ribbon 10 has a plurality of (12, in the example of FIG. 2) optical fibers 11A to 11L arranged in parallel. Each of the optical fibers 11A to 11L is a coated optical fiber of a single fiber. In the meantime, the optical fibers 11A to 11L may be coated with different colors so that the optical fibers can be distinguished one another.

The optical fiber ribbon 10 is an intermittent coupling type optical fiber ribbon, and is intermittently provided with coupling portions 12, at which the adjacent optical fibers are coupled therebetween, and non-coupling portions 13, at which the adjacent optical fibers are not coupled therebetween, in a longitudinal direction in a state where the plurality of optical fibers is arranged in parallel. The portions at which the coupling portions 12 and the non-coupling portions 13 are intermittently provided may be between some of the optical fibers, as shown in FIG. 2 or between all of the optical fibers. In the example of FIG. 2, the non-coupling portion 13 is not provided between the optical fibers 11A and 11B, 11C and 11D, 11E and 11F, 11G and 11H, 11I and 11J, 11K and 11L.

The optical fiber ribbon 10 may be manufactured so that the coupling portions 12 and the non-coupling portions 13 are intermittently formed by intermittently applying a coupling resin such as ultraviolet-curable resin, thermosetting resin or the like between the optical fibers. Alternatively, the intermittent coupling type optical fiber ribbon 10 may be manufactured by applying the coupling resin to the plurality of optical fibers 11A to 11L to couple all the optical fibers and then cutting portions of the optical fibers with a rotary blade or the like to form the non-coupling portions 13.

In the meantime, as the coupling resin, a resin having an excellent peel-off property may be used so as to easily perform an operation of separating the single fibers of the optical fibers.

The tube 3 is to cover the optical unit 2 having the plurality of stranded optical fiber ribbons 10. The tube 3 has a Young's modulus lower than a Young's modulus of the cable sheath 4. The tube 3 is made of a soft material, for example, elastomer, low density polyethylene (LDPE) or the like.

In contrast, the cable sheath 4 is made of high density polyethylene or the like, for example, and has a Young's modulus of about 800 Pa to 1000 Pa. In the meantime, the cable sheath 4 may be made of low density polyethylene. However, also in this case, the Young's modulus thereof should be set to the above-mentioned value. The cable sheath 4 may have therein a tension member 5. Also, the cable sheath 4 may have a tearing cord 6 for tearing the cable sheath 4 upon intermediate branching.

As shown in FIG. 3, for example, the tube 3 has a substantially circular section. However, since the tube 3 is made of a flexible material such as a soft material, it can be easily elastically deformed. The optical fiber cable 1 of the illustrative embodiment has an assembly 8 of a plurality of the tubes 3 each of which has the optical unit 2 accommodated therein. As shown in FIG. 1, the assembly 8 of the plurality of tubes 3 is in a state where some of the plurality of tubes 3 are in surface contact with the cable sheath 4 with the tubes 3 being elastically deformed with respect to one another inside the cable sheath 4. The respective tubes 3 of the assembly 8 are assembled with being stranded one another, for example. When a tensile force is applied upon stranding of the respective tubes 3, for example, a shape of the tube 3 can be deformed as shown in FIG. 2.

The optical unit 2 can be made so that a density of fibers of the optical fiber ribbons 10 is equal to or higher than 1.7 fibers/mm$^2$. Since the tube 3 can be easily deformed as described above, it is possible to reduce a gap inside the sheath. Also, since the intermittent ribbon is used, it is possible to fill the optical fibers in the tube, so that it is possible to easily implement the optical fiber cable 1 in which the density of fibers of the optical fiber ribbons 10 is equal to or higher than 1.7 fibers/mm$^2$.

Preferably, the tube 3 is made using a material having a Young's modulus of 400 MPa or lower. The material having a Young's modulus of 400 MPa or lower is used, so that it is possible to more easily deform the tube 3. On the other hand, the Young's modulus lower than 10 MPa is not favorable because the strength of the tube is reduced.

A thickness of the tube 3 is preferably 0.2 mm or less, for example, about 0.05 mm, although it depends on the flexibility of the material. The tube 3 is manufactured by coating the optical unit 2 with the soft material or the like and performing extrusion molding, for example. In the meantime, as described above, the tube 3 is made to have the thin thickness, so that it is possible to reduce an influence of heat shrinkage caused due to processing strain upon the extrusion molding. In the meantime, the manufacturing limit of the thickness of the tube 3 is about 0.03 mm.

Also, the tube 3 may have therein jelly or water absorption yarn. The tube 3 includes therein jelly or water absorption yarn, so that it is possible to provide the tube 3 with a waterproof function. In the meantime, the tube 3 may have therein a tensile strength element such as aramid fiber and the like.

Also, as shown in FIG. 1, the tearing cord 7 may be longitudinally wrapped or spirally wrapped (refer to FIG. 3) in the tube 3, considering the dissembling of the tube 3 upon the intermediate branching. Since the tearing cord 7 is included in the tube 3, it is possible to easily disassemble only a predetermined tube 3 simply by pulling the tearing cord 7 upon the intermediate branching.

In the meantime, for easy distinguishability, a colored resin may be used for the tube 3. Also, filler such as aramid fiber, water absorption yarn, and the like may be inserted to the outer side of each tube 3.

Figure 4:
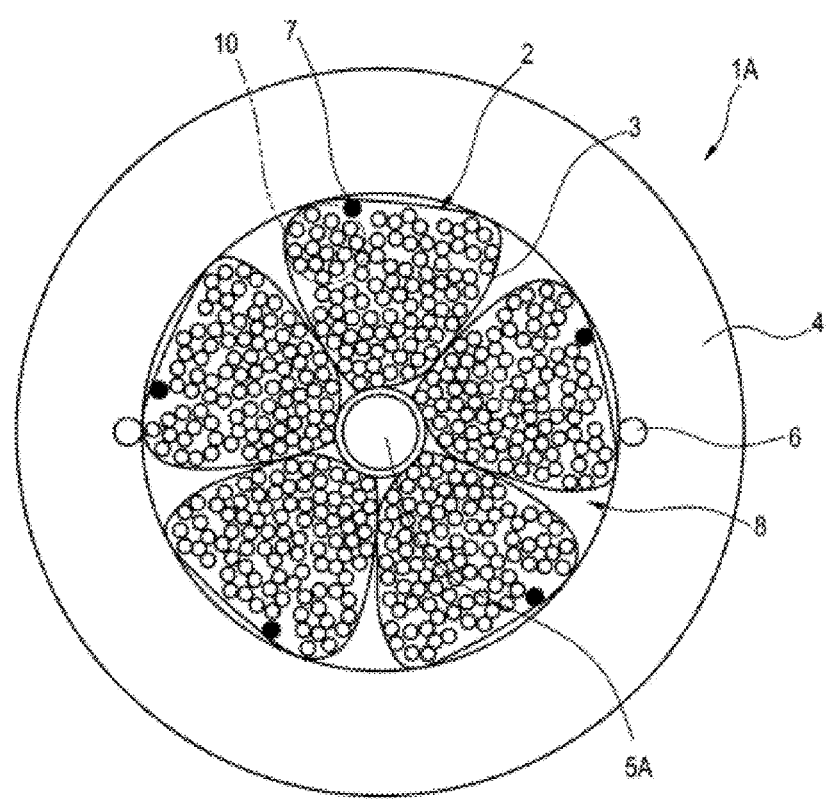
FIG. 4 is a sectional view depicting a modified embodiment of the optical fiber cable in accordance with the aspect of the present disclosure.

Subsequently, a modified embodiment of the optical fiber cable 1 of the illustrative embodiment is described. FIG. 4 is a sectional view depicting a modified embodiment of the optical fiber cable 1. In the meantime, the similar parts to the optical fiber cable 1 shown in FIG. 1 are denoted with the same reference numerals, and the descriptions thereof are omitted.

As shown in FIG. 4, an optical fiber cable 1A of the modified embodiment includes a tension member 5A that is provided at an inner side of the assembly 8 including the plurality of tubes 3. Instead, the cable sheath 4 is not provided therein with the tension member. The other configurations are similar to the optical fiber cable 1.

That is, also in the optical fiber cable 1A, like the optical fiber cable 1, the tube 3 has a Young's modulus lower than a Young's modulus of the cable sheath 4, and the assembly 8 of the plurality of tubes 3 is in a state where some of the plurality of tubes 3 are in surface contact with the cable sheath 4 with the tubes 3 being elastically deformed with respect to one another inside the cable sheath 4. Even with the configuration of the optical fiber cable 1A, it is possible to pack the optical fibers in a high density.

As described above in detail, the optical fiber cable 1, 1A of the illustrative embodiment can be easily deformed because the tube 3 has the Young's modulus lower than the Young's modulus of the cable sheath 4. Therefore, the assembly 8 of the plurality of tubes 3 is in the state where some of the plurality of tubes 3 are in surface contact with the cable sheath 4 with the tubes 3 being elastically deformed with respect to one another inside the cable sheath 4. In this state, as compared to the optical fiber cable of the related art in which each hard tube is hardly elastically deformed and keeps its cylindrical state, a gap inside the cable sheath 4 is reduced, so that it is possible to implement the high-density packing of the optical fibers. Also, when the cable sheath 4 is torn upon the intermediate branching, each tube 3 is exposed. Therefore, when only the predetermined tube 3 is torn to take out the optical fibers, only the optical fibers of the predetermined tube 3 can be integrally exposed. As a result, it is possible to improve the operability when accommodating the optical fibers in a closure and the like.

DESCRIPTION OF REFERENCE NUMERALS

1: optical fiber cable
2: optical unit
3: tube
4: cable sheath
5, 5A: tension member
6, 7: tearing cord
8: assembly
10: optical fiber ribbon
11A to 11L: optical fiber
12: coupling portion
13: non-coupling portion

The invention claimed is:

1. An optical fiber cable comprising an optical unit having a plurality of stranded optical fiber ribbons, a tube having the optical unit accommodated therein, and a cable sheath configured to cover an outer side of an assembly including a plurality of the tubes, wherein each of the optical fiber ribbons is intermittently provided with coupling portions, at which adjacent optical fibers are coupled therebetween, and non-coupling portions, at which adjacent optical fibers are not coupled therebetween, in a longitudinal direction between a part or all of the optical fibers in a state where the plurality of optical fibers is arranged in parallel, wherein each tube is made of low density polyethylene, has a Young's modulus lower than a Young's modulus of the cable sheath, and is not overlapped with said each tube in a peripheral direction, wherein the optical unit is accommodated in the tube in a state where at least one hollow portion is in the tube, wherein the respective tubes of the assembly are assembled stranded to one another, and the assembly is in a state where a part of the plurality of tubes is in surface contact with the cable sheath with the tubes being elastically deformed with respect to another tube inside the cable sheath, wherein a thickness of the tube is equal to or thicker than 0.03 mm or is equal to or thinner than 0.2 mm, and wherein the Young's modulus of the tube is equal to or higher than 10 MPa or is equal to or lower than 400 MPa.

2. The optical fiber cable according to claim 1, wherein in the optical unit, a density of fibers of the optical fiber ribbons is equal to or higher than 1.7 fibers/mm$^2$.

3. The optical fiber cable according to claim 1, wherein the tube includes jelly therein.

4. The optical fiber cable according to claim 1, wherein the tube includes water absorption yarn therein.

5. The optical fiber cable according to claim 1, wherein the tube includes a tearing cord therein.

* * * * *